United States Patent [19]

Schmidthaler

[11] Patent Number: 4,759,622
[45] Date of Patent: Jul. 26, 1988

[54] EYEGLASSES WITH EXCHANGEABLE LENSES

[75] Inventor: Johann J. Schmidthaler, Linz, Austria

[73] Assignee: Optyl Eyewear Fashion International Corporation, Norwood, N.J.

[21] Appl. No.: 845,545

[22] Filed: Mar. 28, 1986

[30] Foreign Application Priority Data

Aug. 5, 1985 [DE] Fed. Rep. of Germany ........... 16272
Aug. 28, 1985 [DE] Fed. Rep. of Germany ... 8524634[U]

[51] Int. Cl.$^4$ ................................................ G02C 1/00
[52] U.S. Cl. .......................................... 351/86; 351/88
[58] Field of Search ............... 351/80, 86, 88, 90–102, 351/138, 140, 149, 132

[56] References Cited

U.S. PATENT DOCUMENTS

| | | |
|---|---|---|
| 2,555,578 | 6/1951 | Davis ..................................... 351/52 |
| 2,738,709 | 3/1956 | Matthews et al. . |
| 4,102,566 | 7/1978 | Shelton ............................... 351/132 |
| 4,176,921 | 12/1979 | Matthias . |
| 4,405,214 | 9/1983 | Bolle ..................................... 351/138 |
| 4,523,819 | 6/1985 | Dianitsch et al. . |

Primary Examiner—Rodney B. Bovernick
Assistant Examiner—Jay Ryan
Attorney, Agent, or Firm—Fitch, Even, Tabin & Flannery

[57] ABSTRACT

The exchangeable lens eyeglasses of the present invention include a frame including a front preferably formed as a one-piece molded plastic part having a pair of spaced rims each having an upper end and a lower end with a bridge interconnecting the rims. The bridge defines an opening. The eyeglasses further include a pair of lenses with each lens supported by a corresponding rim. Each rim has an abutment surface disposed on one side of its lens and a support rib extending on the other side of its lens and cooperating with the abutment surface to seat that lens. The support rib is discontinuous between the lower end the upper end of its rim adjacent the bridge. The eyeglasses further include a retainer preferably formed as a one-piece molded plastic part which is releasably held by the front and has a component received in the opening. The retainer overlaps both lenses and cooperates with the abutment surface of the rims to capture the lenses. Release of the retainer permits removal of the lenses from the front.

11 Claims, 3 Drawing Sheets

U.S. Patent  Jul. 26, 1988  Sheet 1 of 3  4,759,622
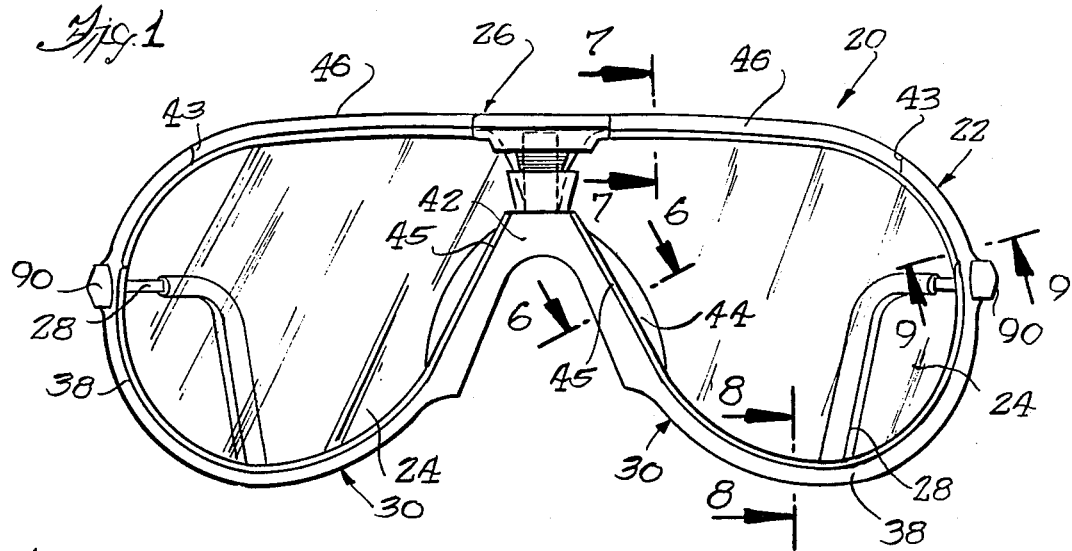
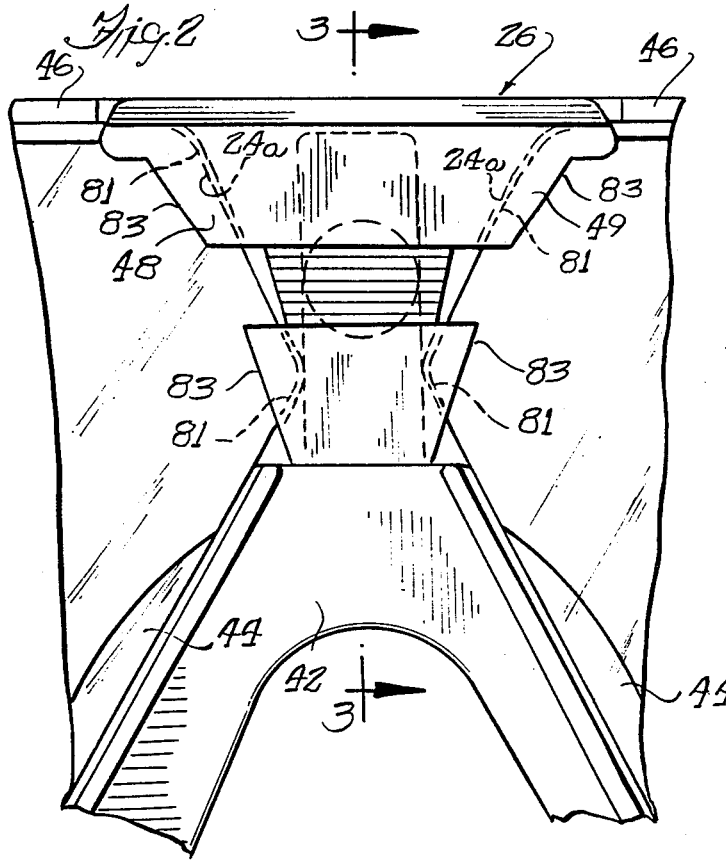

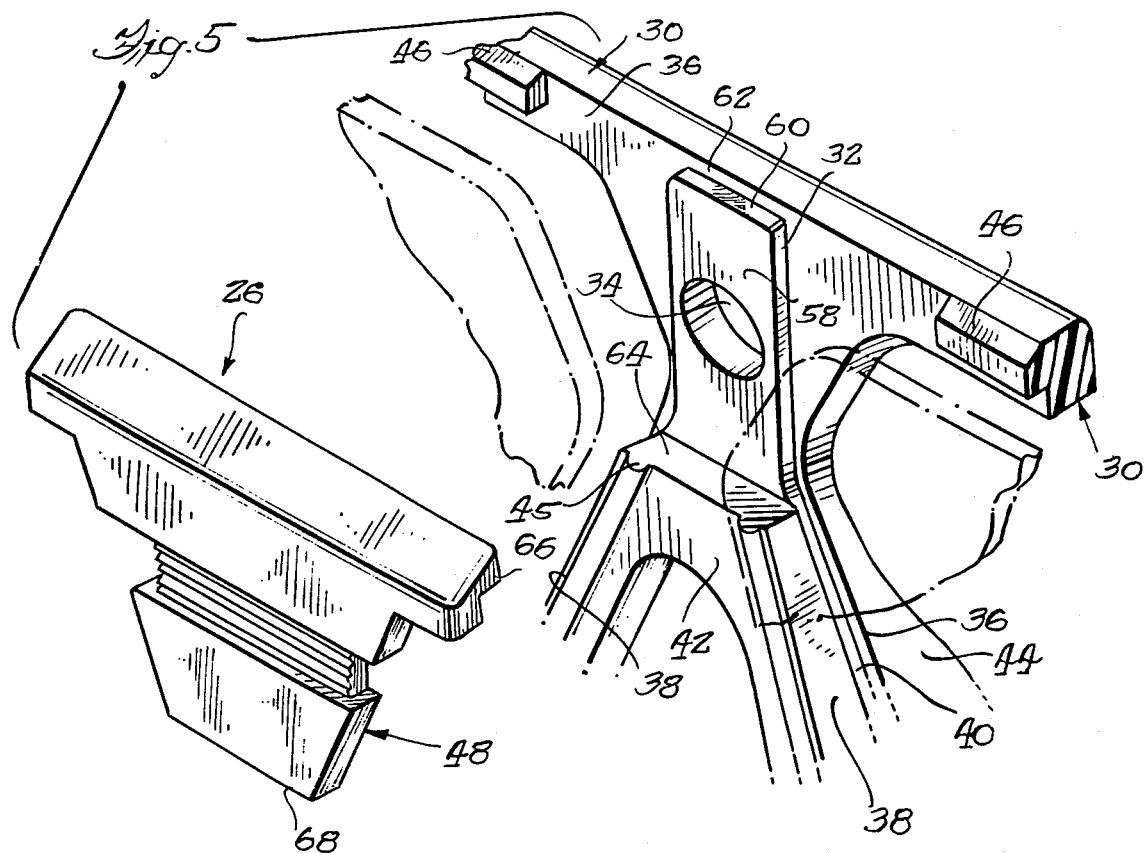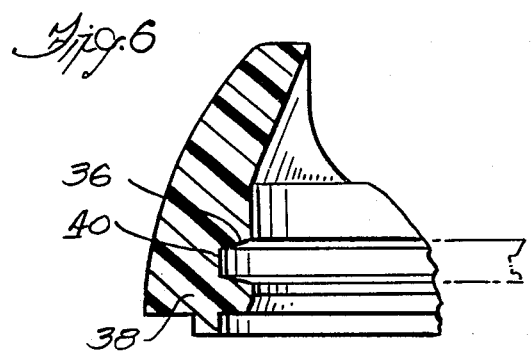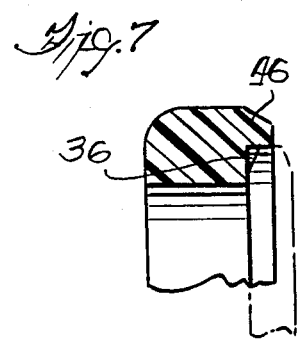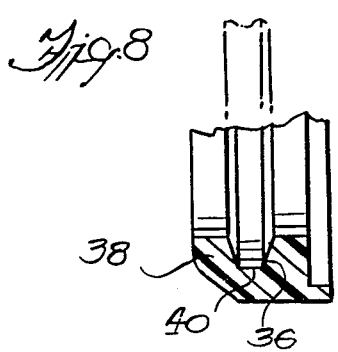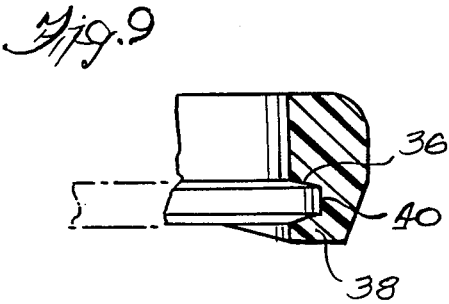

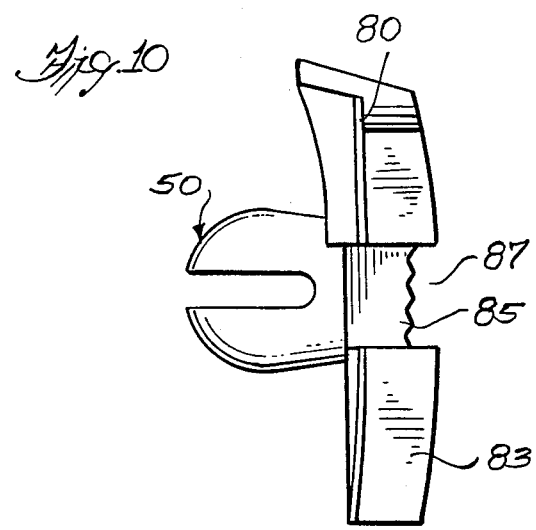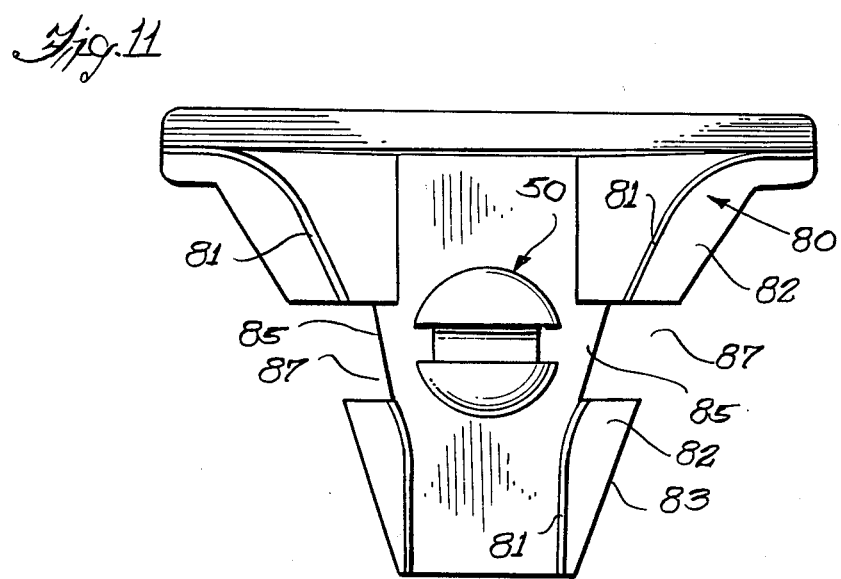

EYEGLASSES WITH EXCHANGEABLE LENSES

This invention relates generally to eyeglasses and, more particularly, to eyeglasses having readily exchangeable lenses.

BACKGROUND OF THE INVENTION

Eyeglasses having exchangeable lenses offer several advantages over conventional eyeglasses having fixed lenses. For example, in the case of sunglasses, different pairs of lenses can be provided for varying light conditions. Some of these lenses are preferably polarized to protect the eyes against ultarviolet rays. In the case of prescription glasses, lenses manufactured to the current prescription of the wearer can be easily exchanged for the out-of-date prescription lenses. Also, in the case of lens and/or frame damage, a single component can be replaced more economically than purchasing an entirely new pair of eyeglasses.

Exchangeable lens eyeglasses have been known for some time but older designs have had significant shortcomings in that they are generally of complex mechanical structure making them expensive to manufacture. Other designs require substantial mutual deformation of the lens and the front component of the frame making insertion and removal of a lens cumbersome and difficult.

Recently introduced exchangeable eyeglass designs have overcome these shortcomings by making replacement of the lenses convenient. In one structure disclosed in U.S. Pat. No. 4,176,921, the eyeglass front is disclosed as being made of wire with complete rims (rims completely encompassing the lenses). Welded to the wire rims are spaced lower hooks for supporting the lenses which are inserted from above until they are embraced by the hooks. A metal lever is hinged to the bridge joining the rims and functions, when rotated downwardly to its holding position, to prevent upward movement of the lenses. Separate plastic nose pads are attached to the wire front. The eyeglasses shown in this patent have met with widespread success but they are relatively expensive due to the wire front, welded hooks, pivoted lever and plastic nose pads which must be assembled to form the completed product.

An eyeglass configuration for a front with partial rims (rims which extend about the periphery of typically only the upper portion of the lenses) includes threads which are received in grooves in the exposed edges of the lenses. The threads are fastened to one end of their associated partial rim and meet at the bridge section of the front where their remaining ends are held by the free ends of pivotal levers for tensioning the threads. A retainer clip, which is hinged to a lower bridge member, overlies the lever free ends to maintain the levers in their tensioning positions. The front used in the eyeglasses are preferably formed of metal to accommodate the wear occasioned by the use of pivoting components, to permit the attachment of hooks, and to provide adequate strength for tensioning. For further information regarding the structure and operation of these exchangeable lens eyeglasses, reference may be made to U.S. Pat. Nos. 4,176,921 and 4,523,819.

SUMMARY OF THE INVENTION

In accordance with an object of the invention, exchangeable lens eyeglasses may be formed less expensively with the lenses locked in position by a single push and pull retainer.

Among the several aspects and features of the present invention may be noted the provision of improved exchangeable lens eyeglasses. Eyeglasses incorporating features of the present invention have frames with a one-piece molded plastic front and the retainer may also be a one-piece retainer having a snug fit interlock with the plastic front to hold the lens in place. Grooves may be molded in the front to support the lenses over a large portion of their periphery so as to avoid localized stress concentration. The retainer used to releasably retain a pair of lenses is easily removed and returned into locking engagement with the front so that lenses can easily be replaced. The eyeglasses of the present invention are reliable in use, have long service life, and are easy and economical to manufacture. Other aspects and features of the present invention will be, in part, apparent and, in part, set forth in the following specification and attendant drawings.

The eyeglasses embodying various features of the present invention include a frame having a front, a pair of lenses supported by the front and a retainer releasably held by the front and cooperating with the front to retain the lenses. The front preferably is molded in one piece of plastic and includes a pair of spaced rims interconnected by a bridge having an opening therein. Each rim has an abutment surface on one side of its lens for bearing on the lens and a support rib extending on the other side of its lens and cooperating with the abutment surface to seat that lens. The support rib terminates short of the bridge. Preferably, the retainer is releasably held by a snap fit or an interference fit with the bridge at the opening. The retainer includes a plate which overlaps both lenses and cooperates with the abutment surfaces of the rims to capture the lenses. Release of the retainer from the front permits removal of the lenses and their replacement.

BRIEF DESCRIPTION OF THE DRAWINGS

FIG. 1 is a front elevational view of eyeglasses embodying various features of the present invention and including a frame having a front, exchangeable lenses and a retainer holding the lenses for support by the front;

FIG. 2 is an enlarged fragmentary front elevational view of the sunglasses of FIG. 1 illustrating the retainer overlapping adjacent portions of the lenses;

FIG. 3 is a sectional view taken generally alaong line 3—3 of FIG. 2 depicting how the retainer is releasable held by the front;

FIG. 4 is a plan view of components shown in FIG. 2;

FIG. 5 is an exploded perspective view of components shown in FIG. 2;

FIG. 6 is a sectional view taken generally along line 6—6 of FIG. 1;

FIG. 7 is a sectional view taken generally along line 7—7 of FIG. 1;

FIG. 8 is a sectional view taken generally along line 8—8 of FIG. 1;

FIG. 9 is a sectional view taken generally along line 9—9 of FIG. 1;

FIG. 10 is a side elevational view of the retainer; and

FIG. 11 is a rear elevational view of the retainer.

Corresponding references characters indicate corresponding components throughout the several view of the drawings.

DESCRIPTION OF THE PREFERRED EMBODIMENT

Referring now to the drawings, a preferred embodiment of exchangeable lens eyeglasses embodying various features of the present invention is generally indicated in FIG. 1 by reference character 20. The eyeglasses 20 includes a frame made up of a front 22 and means such as temples 28 held at the sides of the front and extending rearwardly for holding the front in position before the eyes, a pair of lenses 24 which are exchangeable, and a retainer 26 releaseably holding the lenses 24 for support by the front. By removing the retainer 26 from the front 22 and pushing the lenses 24 forwardly, the lenses 24 are easily dislodged from the front and, as will be discussed hereinafter, another pair of lenses can easily be mounted in and held to the front 22.

Heretofore, as illustrated in U.S. Pat. No. 4,176,921, the exchangeable lens eyeglasses have used a wire metal front and pivoted levers which must be pivotally mounted on the front and hence such front assemblies are more expensive to manufacture than a one-piece molded plastic front. Thus, it is possible to provide a less costly exchangeable lens eyeglasses if a suitable lens retention system is attained.

In accordance with the present invention, the one-piece molded plastic front 22 is formed with retention grooves 40 therein into which are placed the lenses 24 and the portions of the lenses adjacent the bridge are locked into position on the front by the retainer 26 which is also preferably formed of one piece of molded plastic. Thus, the preferred front and retainer may each be easily molded and merely snapped fitted together in contrast to the more expensive assembly operations used heretofore when manufacturing exchangeable lens eyeglasses.

Referring now in greater detail to the illustrated embodiment of the invention, the front 22 is preferably of one-piece molded plastic construction and includes a pair of spaced rims 30 each having an upper end and a lower end. Extending between and interconnecting the rims 30 is a bridge 32 (best shown in FIG. 5) in which is an opening 34. The lenses 24 can be of any desired shape but are preferably oval or egg-shaped to offer a wide field of vision. The rims have a similar shape to the exposed edges of the lenses, with each rim having an abutment surface 36 disposed on the rear side of the exposed edge of its lens for abutting its associated lens. Each rim 30 further includes a rib 38, as best seen in FIGS. 6, 8 and 9, located forwardly of the lens and defining with the abutment surface 36 the groove 40 for seating the lens associated with that rim. The groove 40 also includes a bottom or inner wall spanning the abutment surface 36 and rib 38. The front includes an integral nose piece of thick plastic having a pair of integrally formed nose pads 44 projecting rearwardly of rims 38 at the center of the eyeglass front.

The bridge 32 joins the rims 30 at their upper ends. The outer ribs 38, which constitute support means, are continuous between first end 43 adjacent the top outer edge of the rims and an inner second end 45 adjacent the bridge 32 and nose pads 44. As best shown in FIG. 1, each rib 38 preferably extends a distance of greater than one-half the periphery of its rim, from the nosepiece 42 to adjacent the top of its rim. Each rim 30 has at its upper end an overhang 46 (FIG. 7) extending over the lens carried by that rim. Thus, along the top of the rims the groove 40 includes only the overhang 46 and the abutment surface 36, as best seen in FIG. 7. As is best shown in FIGS. 1 and 2, the overhangs 46 cover the top edges of the lenses and the ribs substantially encompass the sides and lower periphery of the lenses 24 leaving only the inner corners of the lenses at the bridge uncovered. The retainer holds these inner corners at the edges of the lenses as will be described.

The retainer 26, best depicted in FIGS. 2-5 and 10-11, is also preferably of integral molded plastic construction. It comprises a plate 48 overlapping each of the held lenses 24 at the inner corners thereof and cooperating with the rims 30 to releasably retain the lenses. The retainer includes a pin 50 extending perpendicularly to the plate and received in the bridge opening 34 in an interference fit or snap fit. The pin 50 is bifurcated, having a pair of prongs 52 spaced by a slot 54. The distal end of each prong is tapered, having a ramp surface 56 for reception in the opening 34. The prongs 52 are resiliently inwardly deflectable so that by pushing the retainer toward the bridge with the pin 50 aligned in the opening 34, the material of the bridge defining the opening 34 bears against the ramp surfaces 56 causing the prongs to deflect together permitting full reception of the pin into the opening. Upon cessation of inward movement, the retainer is held to the front by virtue of the expanded prongs and the friction between the prongs and the material defining the opening 34. The prongs 52 may be deflected together and this friction can be overcome by pushing or pulling of the retainer 26 from the opening 34 in the frame 22. However, in the absence of the application of external force, the retainer 26 is firmly held by the bridge 32 so that the lenses are prevented from escaping from the rims.

Referring to FIG. 5, the bridge 32 has a vertical standoff ridge 58 for limiting movement of the retainer plate 48. The ridge 58 terminates in a ledge surface 60 short of the top of the bridge 32 and defines a recess 62. The nosepiece 42 also terminates in a substantially flat, horizontally disposed ledge surface 64. The retainer plate 48 carries at its upper end a generally horizontal disposed, rearwardly directed lip 66 which is received in the recess 62 and bears on the ledge surface 60. The plate 48 terminates at its lower end is a horizontally disposed, substantially flat surface 68 facing the nosepiece ledge surface 64. The lip 66 as well as the surfaces 60, 64 and 68, constitute, at least in part, anti-rotation means for preventing rotation of the retainer 26 about the pin 50. If the retainer were free to rotate, it would not only allow the eyeglasses to appear dishevelled but would also present an opportunity for the pin 50 to work out of the opening 34.

As best seen in FIG. 10, the rearwardly facing side of the retainer is formed with recesses 80 into which project upper inner portions 24 (FIG. 2) of the lens so that the retainer overlaps these lens portions 24a. The recesses 80 are formed by a curved vertical shoulder 81 extending in the fore and aft direction and intersecting the laterally extending wall 82 which extends from the shoulder 81 to outer edge 83 of the wall 82. A small thin center section 85 on the retainer leaves slots 87 which divide the shoulders 81 and laterally extending walls into spaced upper and lower portions. Thus, it will be seen that the preferred retainer is a small triangular shaped piece of plastic which can be snap fitted into interlocking engagement with the bridge so that the laterally extending walls 82 overlap the edge portions 24a of the lenses and the shoulders 81 hold the lens portions 24a against inward movement.

As shown in FIG. 4, the bridge 32 has a bevelled rear entry 70 to the opening 34. The retainer pin projects only a limited extent rearwardly for about the depth of the bridge so that it will not be accidentally depressed to release the lenses. The bevelled opening is sized to admit a fingertip and this permits the retainer pin 50 to be partially dislodged by pushing the exposed end of the pin with a finger. The retainer then can be fully removed by catching the lip 66 with a fingernail.

Operation of the exchangeable lens eyeglasses 20 of the present invention is as follows: Lenses 24 in the eyeglasses can be conveniently removed by dislodging the retainer 26 and pressing the portion of the lenses adjacent the bridge 32 so as to cause the upper portion of the lenses to move outwardly beyond the overhangs 46. The upper inner edge of each lens can then be grasped and the lens pulled from its rim 30. The exchange lenses are mounted by holding a lens at its upper inner portion and seating the lens in the groove defined by the rib 38 and the abutment surface 36. With only slight mutual deformation, the upper portion of a lens can be pushed underneath its corresponding overhang 46. With both lenses thus positioned, the pin 50 of the retainer 26 is aligned in the opening 34 of the bridge 32. By pushing the retainer against the bridge, the prongs 52 of the bifurcated pin 50 are caused to deflect inwardly allowing the plate 48 of the retainer to come to rest against the standoff ridge 58. Shoulder 81 and wall 82 on the retainer abut the inner upper corner portions 24a of the lenses 24 and lock the lenses in position. As the lip 66 is positioned on the ledge surface 60, rotation of the retainer is precluded.

The preferred eyeglass front 22 has a pair of temple lugs 90 (FIG. 1) molded on opposite outer edges thereof and molded with a shape so that the temple hinges can be readily secured thereto by screws projecting through molded bores in the temples. Thus, in the illustrated embodiment of the invention, the lugs are preformed to have bores so that a single screw fastening operation will attach the temples and hinge assemblies to complete the assembly of the eyeglasses.

It will be appreciated that the front 22 and the retainer 26 of the eyeglasses 20 of the present invention are preferably formed of economical integral molded plastic construction. It should also be appreciated that the lens are supported throughout a substantial portion of the periphery of the lens, thereby avoiding any localized stress concentrations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Eyeglasses of the type having removal lenses comprising:
   a pair of lenses,
   a frame including a one-piece plastic front defining a pair of support rims having grooves formed therein with portions of the lenses positioned in the grooves and held thereby,
   bridge means on the front interconnecting the support rims at a central location therebetween,
   a pair of nose pads carried by said front and which diverge behind said lenses to partially overlap the lenses,
   said grooves releasably supporting the lenses on the front, and a one-piece retainer having a snap fit interconnection with the front at said bridge means and having portions sufficiently overlapping and engaging adjacent portions at the front of the lenses in the respective rims that said lenses cannot be removed from said front when said retainer is mounted on said front, said portions of said lenses being disposed inwardly of the peripheries of said lenses, said retainer having sufficient rigidity that it can be pushed from said front,
   said retainer being movable between a first retaining position in which the retainer engages the corners of the lenses so as to lock the lenses in the front and to prevent removal of the lenses from the front and a second position in which the retainer is removed from the front which permits removal of the lenses from the rims,
   an interlocking pin is formed on one of said bridge means and said retainer and a receiving opening for the pin is formed on the other of said bridge means and said retainer and said pin and said opening provide the snap fit to interlock the retainer to the front, said pin being bifurcated, having a pair of prongs spaced by a slot, the distal end of each prong being tapered, having a ramp surface for reception in said opening, said prongs being resiliently inwardly deflectable so that by pushing the retainer toward the bridge means with the pin aligned in the opening, the material of the bridge means defining the opening bears against the ramp surfaces causing the prongs to deflect together permitting full reception of the pin into the opening.

2. Eyeglasses as defined in claim 1 in which said retainer is a one-piece molded plastic piece of generally triangular shape.

3. Eyeglasses in accordance with claim 1 in which the opening is formed in the bridge means and extends through the front, an enlarged bevel surface is formed on rearward side of the bridge means at the opening defining an enlarged recess allowing the finger of a person to engage and push the pin on the retainer forwardly relative to the bridge means for removal of the retainer from the front.

4. Eyeglasses in accordance with claim 1 in which the groove in the rims comprises a slot in the lower portion of the rims into which is fitted the lower edge of an associated lens, and each rim further including an upper overhanging ridge extending across the top edge of the associated lens.

5. Eyeglasses comprising:
   a frame means including a front having a pair of spaced rims each having an upper end and a lower end, and a bridge means extending between said rims and interconnecting said rims, said bridge means defining an opening;
   a pair of lenses with each lens supported by a corresponding rim, each rim including an abutment means disposed on one side of its lens for abutting its lens and a support means extending on the other side of its lens and cooperating with said abutment means to seat its lens, said support means being discontinuous between the lower end and the upper end of its rim adjacent said bridge means;

a pair of nose pads carried by said front and which diverge behind said lenses to partially overlap the lenses; and a retainer releasably held by said front and having a component received in said opening, said retainer having a sufficient rigidity that it can be pushed from said front, said retainer overlapping both lenses on their other sides at areas of said lenses disposed inwardly of their peripheries so that said lenses cannot be installed or removed with said retainer held by said front and cooperating with said abutment means of said rims capture said lenses, release of said retainer permitting removal of said lenses from said front, said frame means comprising a pair of temples extending rearwardly from said front, said one side being the rear side and said other side being the front side, said retainer component is a pin received in said opening in an interference fit; and said pin is bifurcated with the prongs thereof being resiliently deflectable inwardly from a spaced position.

6. Eyeglasses as set forth in claim 5 wherein said front is a one-piece plastic construction.

7. Eyeglasses as set forth in claim 5 wherein said rims are full so as to extend completely about the periphery of their corresponding lens.

8. Eyeglasses as set forth in claim 5 wherein said bridge means joins said rims adjacent their upper ends, and wherein each of said rims has an overhang at its upper end extending over the lens carried by that rim.

9. Eyeglasses as set forth in claim 8 wherein the support means and overhangs of said rims and said retainer substantially encompass the periphery of said lenses.

10. Eyeglasses as set forth in claim 9 wherein said frame means defines a recess extending between said overhangs, said retainer comprising a lip extending into said recess.

11. Eyeglasses as set forth in claim 5 wherein said support means includes a rib extending over a distance greater than one-half the periphery of its rim, said abutment means and said rib defining a groove for seating the lens carried by that rim.

* * * * *

UNITED STATES PATENT AND TRADEMARK OFFICE
CERTIFICATE OF CORRECTION

PATENT NO. : 4,759,622

DATED : July 26, 1988

INVENTOR(S) : Johann Josef Schmidthaler

It is certified that error appears in the above-identified patent and that said Letters Patent is hereby corrected as shown below:

Face of Patent, In the Abstract, line 12, after "end" (first occurrence) insert --and--.

Column 1, line 14, change "ultarviolet" to --ultraviolet--.
    Column 2, line 49, change "alaong" to --along--.
    Column 2, line 50, change "releasable" to --releasably--.
    Column 2, line 66, change "references" to --reference--.
    Column 2, line 67, change "view" to --views--.
    Column 3, line 12, change "releaseably" to --releasably--.
    Column 3, line 24, delete "a".
    Column 4, line 42, change "horizontal" to --horizontally--.
    Column 4, line 45, change "is" to --in--.
    Column 7, line 8, delete "a".
    Column 7, line 14, after "rims" insert --to--.

Signed and Sealed this

Sixth Day of December, 1988

Attest:

DONALD J. QUIGG

Attesting Officer      Commissioner of Patents and Trademarks